(12) United States Patent
Therisod

(10) Patent No.: US 7,233,740 B2
(45) Date of Patent: Jun. 19, 2007

(54) SELF-CHARACTERIZING AND SELF-PROGRAMMING OPTICAL TRANSMITTER

(75) Inventor: Stefano Therisod, Sunnyvale, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 660 days.

(21) Appl. No.: 10/674,583

(22) Filed: Sep. 29, 2003

(65) Prior Publication Data
US 2005/0069315 A1 Mar. 31, 2005

(51) Int. Cl.
*H04B 10/08* (2006.01)
*H04B 10/04* (2006.01)
(52) U.S. Cl. .................... 398/33; 398/38; 398/192; 398/197
(58) Field of Classification Search ............... 398/23, 398/25, 33, 38, 182, 192, 193, 195, 197
See application file for complete search history.

(56) References Cited

U.S. PATENT DOCUMENTS
5,548,435 A * 8/1996 Tahara et al. ............. 398/195

FOREIGN PATENT DOCUMENTS
EP 0548111 B1 9/1997
WO WO 03/069378 A2 8/2003

OTHER PUBLICATIONS
German Office Action dated Nov. 2, 2005.
* cited by examiner

*Primary Examiner*—Dalzid Singh

(57) ABSTRACT

A transmitter uses an on-chip pattern generator to provide an input signal, and a built-in monitor to detect the power of the light emitted by the light source. The transmitter determines the correlation between the output power measured by an external power meter, and the output power detected by the built-in monitor. After the correlation is determined, the external power meter is no longer needed. Instead, further characterizations, such as over-temperature characterizations, are performed by determining the power detected by the built-in monitor, and then using the known correlation to calculate the actual power output and other transmitter characteristics.

19 Claims, 2 Drawing Sheets

SELF-CHARACTERIZING AND SELF-PROGRAMMING OPTICAL TRANSMITTER

FIELD OF THE INVENTION

The invention is directed towards optical fiber transmitters and more specifically, towards characterizing and adjusting the response of the transmitters.

BACKGROUND OF THE INVENTION

Optical fiber transmitters use a variety of different light sources, including Vertical Cavity Surface Emitting Lasers (VCSEL); Light Emitting Diodes (LED); lasers, and other light-emitting devices. However, due to variations in the manufacturing process, the individual produced transmitters have dissimilar behaviors. Furthermore, the output properties of these optical sources change with temperature as well. Therefore, each transmitter is first characterized to determine its output response, and then is subsequently adjusted to make its response comply with the required specifications. For example, bias current and modulation current of the transmitter may need to be adjusted so that its minimum and maximum power output levels fall within acceptable limits. This process of adjusting the transmitter to change its output response is referred to as "programming" the transmitter.

The prior art conventional programming method is to connect a pattern generator to the transmitter input, connect an optical power meter at the transmitter output, and then change the temperature while characterizing and programming the transmitter's output response to different inputs and at different temperatures to bring its performance in line with specifications.

Unfortunately, the pattern generators and optical power meters used for measuring the output characteristics are expensive, and the number of devices that can be simultaneously tested is constrained by the number of test pattern generators and power meters available. These constraints are especially limiting during the temperature characterization because it is such a time-consuming process.

SUMMARY OF THE INVENTION

In a preferred embodiment of the present invention, an optical transmitter performs self-characterization and self-programming by using an on-chip pattern generator for an input signal, and a built-in optical monitor to detect the optical power of the light emitted by the light source. Since the pattern generator and optical monitor are already incorporated into the transmitter design, less test equipment is needed during the characterization and programming process. This increases the number of devices that can be simultaneously characterized given the same capital investment.

The optical transmitter first determines, at room temperature, the correlation between the output power as measured by an external optical power meter, and the output power detected by the built-in optical monitor on the transmitter. Once the correlation is determined, the external optical power meter is no longer needed. Further measurements of the optical transmitter, such as over-temperature characterizations, are performed by determining the power detected by the built-in optical monitor, and then using the known correlation to calculate what the actual power output would be if measured using the external power meter.

Further features and advantages of the present invention, as well as the structure and operation of preferred embodiments of the present invention, are described in detail below with reference to the accompanying exemplary drawings.

DETAILED DESCRIPTION

Figure 1:
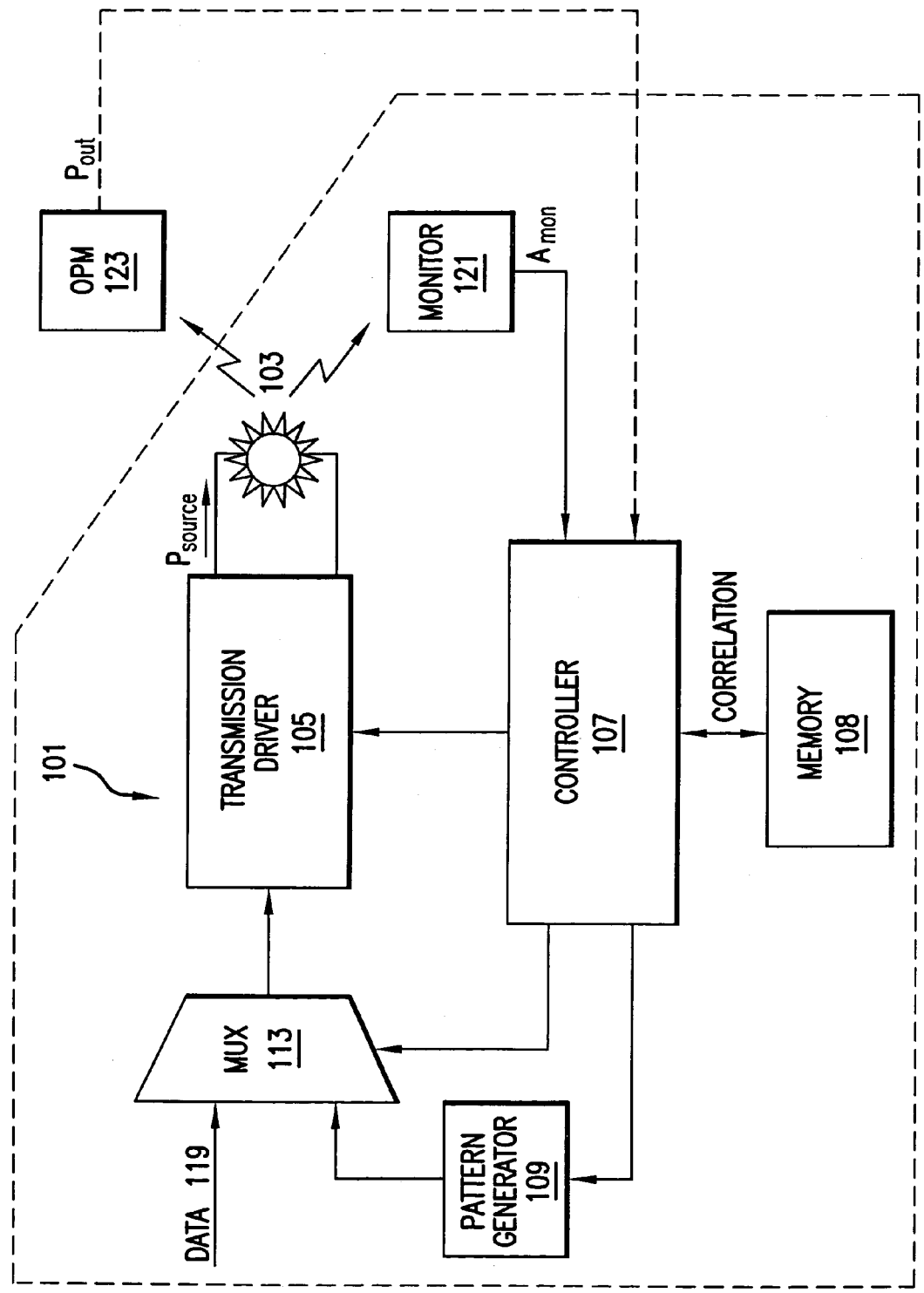
FIG. 1 shows a high-level block diagram of a preferred embodiment of an optical transmitter made in accordance with the teachings of the present invention.

FIG. 1 shows a high-level block diagram of a preferred embodiment of an optical transmitter 101 made in accordance with the teachings of the present invention. A light source 103, which may be a VCSEL, LED, or other light-emitting device, is driven by a transmission driver 105. The transmission driver 105 controls the light output of the light source 103 as well as its extinction ratio. A controller 107 communicates with the transmission driver 105 to control and adjust parameters such as the highest and lowest emitted power from the light source. The controller 107 also communicates with a memory 108 for storing and retrieving data. The memory 108 may be an EEPROM local to the optical transmitter 101, cache memory on the same chip as the controller 107 itself, or any other storage mechanism.

A pattern generator 109 generates a pattern that may be used as input to the transmission driver 105 during characterization. Possible patterns that may be generated include a continuous one, a continuous zero, a Pseudo Random Bit Sequence (PRBS), a 1010 pattern, and many others. The pattern generator 109 is incorporated into the optical transmitter 101, and can be combined on-chip with other circuitry of the optical transmitter 101.

The controller 107 controls the pattern generator 109 to determine which pattern is selected. The controller 107 also controls a mutiplexer 113 to select between a data stream 119 (in normal operation), and pattern from the pattern generator 109 (during characterization and programming) for input to the transmission driver 105. The controller 107 can be implemented in hardware circuitry, software programming algorithms, or firmware. It can be a microprocessor or a specialized Application Specific Integrated Circuit (ASIC).

An optical monitor 121 in the optical transmitter 101 responds to and monitors the light emitted by the light source 103. The optical monitor 121 generates a signal $A_{mon}$ that is indicative of the optical power emitted by the light source 103. $A_{mon}$ can be any characteristic of the optical monitor that is responsive to the power of light, such as its current, resistance, capacitance, etc. For example, if a photodiode is used as the optical monitor 121, $A_{mon}$ may be derived from the current through the photodiode. Or, if a photoresistor is used as an optical monitor 121, then $A_{mon}$ may be derived from the resistance of the photoresistor. The present invention is readily adaptable for use with other photosensitive devices, such as phototransistors and photocapacitors.

An optical power meter (OPM) 123, external to the optical transmitter 101, also measures the light emitted from the light source 103 and generates a power indicator $P_{out}$. However, the OPM 123 is only needed temporarily for characterization at room temperature, as will become apparent in the paragraphs to come.

Both the optical power indicator $A_{mon}$ as measured by the optical monitor 121, and the optical power $P_{out}$ as measured by the OPM 123, are inputs to the controller 107. The controller 107 calculates the correlation between $A_{mon}$ and $P_{out}$ and stores the correlation in the memory 108. The correlation between $A_{mon}$ and $P_{out}$ is the relationship between the values of $A_{mon}$ and $P_{out}$ such that the optical transmitter 101 can calculate and predict what the value of $P_{out}$ would be for a given value of $A_{mon}$ based on this relationship.

The format in which the correlation is stored may vary. For example, the correlation can be recorded locally in the memory 108 as a look-up table of data points, using the values of $A_{mon}$ as an index to the corresponding values of $P_{out}$. Interpolation between or extrapolation of the stored values may be used to calculate values of $P_{out}$ for any values of $A_{mon}$ that are not stored in such a table. Or, the correlation may be able to be stored as an equation or algorithm, where $P_{out}$ is a function of $A_{mon}$. Other methods of storing the correlation may also be used.

Figure 2:
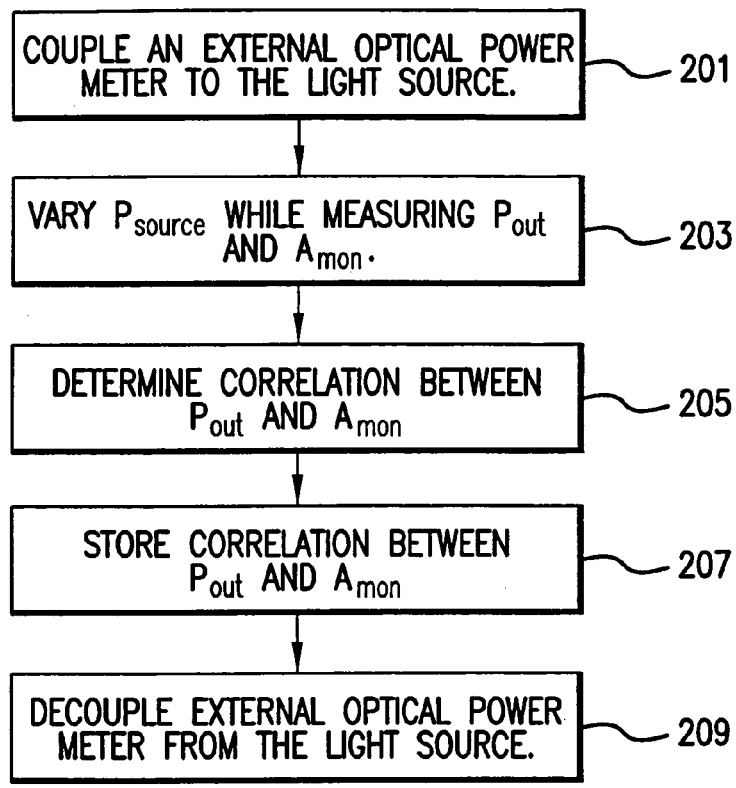
FIG. 2 is a flowchart that illustrates the correlation process in the optical transmitter, according an embodiment of the present invention.

FIG. 2 is a flowchart that illustrates the correlation process in the optical transmitter 101, according to an embodiment of the present invention. In step 201, the OPM 123 is coupled to the output of the optical transmitter 101 at room temperature. Next, in step 203, the controller 107 varies the output power $P_{source}$ of the light source 103 while the OPM 123 and the optical monitor 121 simultaneously measure the output power of the light source 103 and generate indicators $P_{out}$ and $A_{mon}$, respectively. Multiple values of $P_{out}$ and the corresponding values of $A_{mon}$ should be measured, to ensure accuracy in the final stored correlation.

In step 205, the controller 107 determines the correlation between $P_{out}$ and $A_{mon}$ and stores it in the memory 108 (step 207) for later retrieval by the optical transmitter 101. Once the correlation between $P_{out}$ and $A_{mon}$ has been determined, the external OPM 123 can be decoupled from the optical transmitter 101 and removed from the system (step 209), since it is no longer needed. Instead, the correlation between $P_{out}$ and $A_{mon}$ is used to determine other parameters that may be needed to program the transmitter.

For example, the power level of the optical transmitter that represents a digital one ($P_1$), and the power level that represents a digital zero ($P_0$), are typically measured in order to fully characterize the light source. $P_1$ and $P_0$ can be easily determined without the external OPM 123 after the correlation between $P_{out}$ and $A_{mon}$ has been calculated and stored, by reading $A_{mon}$ from the optical monitor 121 and translating this value to the corresponding $P_{out}$ using the correlation data previously collected.

Figure 3:
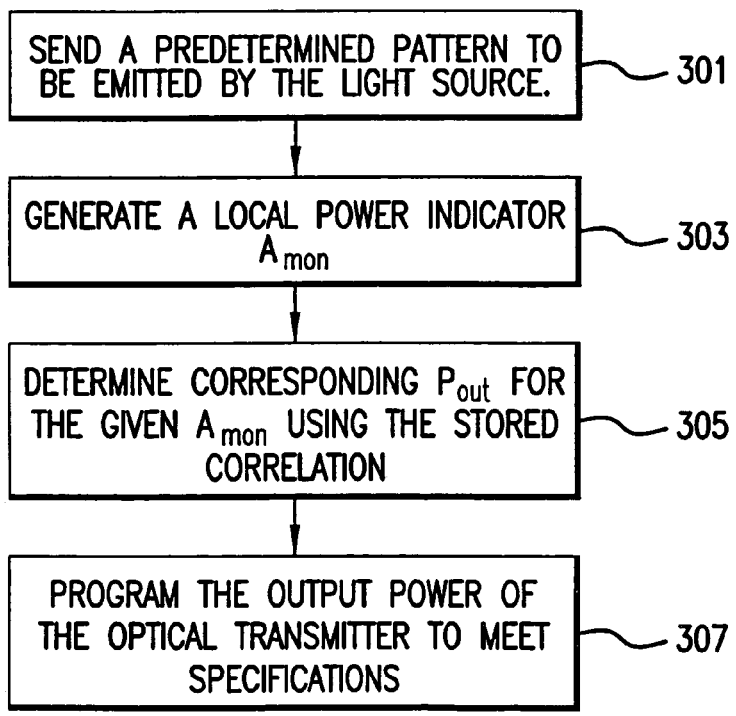
FIG. 3 is a flowchart that illustrates how to characterize and program the optical transmitter after the correlation of FIG. 2 between $P_{out}$ and $A_{mon}$ has been determined, according to an embodiment of the present invention.

FIG. 3 is a flowchart that illustrates how to characterize and program the optical transmitter 101 after the correlation between $P_{out}$ and $A_{mon}$ has been determined, according to an embodiment of the present invention. In step 301, the controller 107 signals the pattern generator 109 to send a sequence of continuous digital ones to the transmission driver 105. The light source 103 will emit light at its power level that represents a digital one. Since the pattern generator 109 is incorporated into the optical transmitter 101, there is no need to hook up an external pattern generator.

Next in step 303, the optical monitor 121 generates a power indicator $A_{mon}$ that is representative of the power level it measures from the light source 103. Then, in step 305, the controller 107 uses the stored correlation to find or calculate the corresponding value $P_{out}$ for the given $A_{mon}$. This corresponding $P_{out}$ also happens to be $P_1$ for the optical transmitter 101, which is the power emitted by the light source 103 when the transmission driver 105 drives a digital one. Due to the initial correlation process described in FIG. 2, this calculated value is virtually identical to the value that would have been measured by an OPM 123 if one had actually been hooked up to the optical transmitter 101. If $P_1$ is not within prescribed limits, the controller 107 programs the transmission driver 105 to bring $P_1$ within acceptable levels (step 307). This may mean adjusting the bias current of the light source 103, its modulation current, or both.

A similar process is followed to determine $P_0$, with the difference that the controller 107 signals the pattern generator 109 to send a sequence of continuous digital zeroes rather than digital ones. After calculating $P_1$ and $P_0$, other parameters can easily be determined, such as the average power ($P_{avg}=(P_0+P_1)/2$), the extinction ratio ($ER=P_1/P_0$), etc. The pattern generator 109 may also generate other patterns, such as a 1010 pattern or a PRBS, to enable the calculation of other transmitter parameters.

The same processes can also be performed as the temperature is changed, to characterize the optical transmitter 101 over a wide range of temperatures. Using the correlation is especially useful during these over-temperature characterizations. No external test equipment is needed, since the pattern generator 109 is integrated into the optical transmitter 101 and no external optical power meter is required. Therefore, the number of devices that can be tested is limited only by the capacity of the temperature-controlled test chamber.

Depending on the design of the optical transmitter, it is possible that the correlation between $A_{mon}$ and $P_{out}$ may not be strictly independent of temperature. The output response of the optical transmitter when an integrated pattern generator 109 drives its input may also be different from the output response when the optical transmitter is connected to an external pattern generator. However, the controller 107 can be programmed to account and compensate for any such variations.

These techniques may also be used to characterize any changes in the response of the optical transmitter over time, or other environmental changes.

In an alternate embodiment of the invention, the controller 107, or the memory 108, or both the controller 107 and the memory 108, are located outside of the optical transmitter 101. For example, the controller 107 and/or memory 108 may be located in an external computer that is connected to the optical transmitter 101 only during characterization and programming. Since the controller 108 and/or memory 108 are not strictly needed during normal operation, it may not be necessary for these components to be a permanent part of the optical transmitter 101.

While primarily described in terms of transmitters of optical light, the present invention could also apply to transmitters of infrared light, ultraviolet light, and other segments of the electromagnetic spectrum.

Although the present invention has been described in detail with reference to particular preferred embodiments, persons possessing ordinary skill in the art to which this invention pertains will appreciate that various modifications and enhancements may be made without departing from the spirit and scope of the claims that follow.

I claim:

1. A method for operating a transmitter to transmit a signal at an output power level, comprising:
   coupling to an external power meter to receive a first external output power level of the transmitter;
   measuring a first internal output power level of the transmitter with an integrated monitor;
   determining a correlation between external and internal output power levels from the first external output power level and the first internal output power level;
   storing the correlation in memory;
   decoupling from the external power meter;
   measuring a second internal output power level that represents a digital value with the integrated monitor;
   determining a second external output power level from the second internal output power level and the correlation; and
   adjusting an output power of the transmitter when the second external output power level is unacceptable.

2. The method as in claim 1, wherein the digital value is selected from the group consisting of a digital zero and a digital one.

3. The method as in claim 1, further comprising:
   changing the temperature of the transmitter and repeat said measuring a second internal output power level, said determining from the correlation, and said adjusting an output power.

4. The method as in claim 1, wherein the correlation is stored as a lookup table in which
   the internal output power level measured by the monitor is the index value, and the corresponding value is the external output power level measured by the external meter.

5. The method as in claim 1, wherein the memory is integrated with the transmitter.

6. The method as in claim 1, wherein the memory is external to the transmitter.

7. A transmitter, comprising:
   a light source;
   a transmission driver driving the light source;
   a monitor integrated with the transmitter that receives light from the light source and generates a power indicator corresponding to the power of the light source;
   a controller that:
     controls the transmission driver,
     receives the power indicator from the monitor,
     receives the power measured by an external power meter,
     compares the power indicator from the monitor to the power measured by the external power meter, and
     determines the correlation between the power indicator and the power measured; and
   a pattern generator in communication with the transmission driver and controlled by the controller, that generates signal patterns to send to the transmission driver.

8. The transmitter as in claim 7, further comprising:
   a memory device in communication with the controller, for storing the correlation determined by the controller.

9. The transmitter as in claim 7, wherein the transmitter includes an optical transmitter.

10. The transmitter as in claim 7, wherein the controller further:
    causes the pattern generator to generate a pattern having a digital value;
    determines a power that would be measured by the external power meter from the power indicator and the correlation; and
    adjusts an output power of the transmission driver when the power that would be measured is unacceptable.

11. The system as in claim 10, wherein the digital value is selected from the group consisting of a digital zero and a digital one.

12. The transmitter as in claim 7 wherein the pattern generator is integrated into a chip with other circuitry in the transmitter.

13. A system, comprising:
    a transmitter, comprising:
      a light source;
      a transmission driver driving the light source; and
      a monitor integrated with the transmitter that receives light from the light source and generates a power indicator corresponding to the power of light source;
    a controller that:
      controls the transmission driver,
      receives the power indicator from the monitor,
      receives the power measured by an external power meter,
      compares the power indicator from the monitor to the power measured by the external power meter, and
      determines the correlation between the power indicator and the power measured;
    a memory device in communication with the controller, for storing the correlation determined by the controller; and
    a pattern generator in the transmitter that
      generates signal patterns to send to the transmission driver, and
      is controlled by the controller.

14. The system as in 13, wherein the monitor is integrated with the transmitter.

15. The system as in 13, wherein the memory device is located on a computer that is connected to the transmitter during characterization and programming.

16. The system as in 13, wherein the controller is located on a computer that is connected to the transmitter during characterization and programming.

17. The system as in claim 13, wherein the controller further:
    causes the pattern generator to generate a pattern having a digital value;
    determines a power that would be measured by the external power meter from the power indicator and the correlation; and
    adjusts an output power of the transmitter when the power that would be measured is unacceptable.

18. The system as in claim 17, wherein the digital value is selected from the group consisting of a digital zero and a digital one.

19. The system as in claim 13, wherein the pattern generator is integrated into a chip with other circuitry in the transmitter.

* * * * *